Patented Nov. 28, 1933

1,936,714

UNITED STATES PATENT OFFICE 1,936,714

COMPOSITION FOR REMOVING BOILER SCALE AND THE LIKE AND METHOD OF PREPARING SAME

David William Haering, Chicago, Ill.

No Drawing. Application May 29, 1931
Serial No. 541,126

4 Claims. (Cl. 87—27)

The present invention relates to a composition for preventing scale in boilers and inhibiting pitting and embrittlement of the boiler plates; also to the method of preparing the composition.

Another object is the formation of a composition also useful for water treatment in washing and rinsing.

More specifically a purpose of the invention is the preparation of a composition of matter by the fermentation of the juice of plants of the order of Opuntiales, family Cactaceæ or Opuntiaecæ which in turn are divided into approximately 20 genera the more important of which are Cereus, Cactus, and Opuntia.

The above and other objects will be readily apparent from the detailed description hereinafter appearing.

The best known member of the order Opuntiales is the species cactus, there being about 300 species in all. Although these present striking differences in physical and structural characteristics, nevertheless in their component chemical constituents they are strikingly similar. The variations in the quantity of moisture and in the temperature of the numerous localities where different species of cactus grow account for what dissimilarity exists in chemical composition between species. However, this dissimilarity is primarily in the character of the carbohydrates, which they all contain in very large quantities.

Cactus plants usually contain carbohydrates as mono-, di- and polysaccharides. Often also there are present pentose polysaccharides, pentosans and colloidal carbohydrates, also glucosides, glucosides as saponins, as well as organic acids. Glucose, fructose, galactose, and arabinose are found in varying proportions and among the acids may be numerated formic, acetic, butyric and malic acids.

These compounds are usually not all present in any one species, but all of them are to be found among the different species in addition to a large number of other organic substances which may be the result of decomposition, polymerization or hydrolysis, or simply as normal constituents of the plant.

Although as indicated any specie of the order may be used as a starting point in the preparation of my novel composition, I prefer to use *Opuntia lindheimeri*, Cactaceæ, commonly known as nopal or nopal cactus. One pound of the fresh nopal is finely ground, making possible the extraction of reducing glucosides. Emphasis is desired to be placed on the use of the plant in freshly cut condition as a portion of the active constituents are in solution and suspension in the natural juices of the plant and due to their colloidal nature are not wholly extractable from the dried or cured plant.

The crushed cactus is placed in a container and exposed to the air for a varying period of time, preferably from 24 to 48 hours. This permits fermentation to set in with decomposition of the saccharides into weak organic acids, thus increasing the acidity of the juice. Further, the acids act upon the glucosides, hydrolyzing a portion of these with the consequent formation of the reducing sugars. The action is similar to the hydrolysis of the well-known glucoside amygdalin which is represented by the following equation:

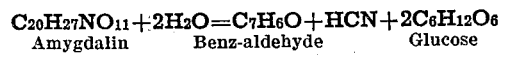
$$C_{20}H_{27}NO_{11} + 2H_2O = C_7H_6O + HCN + 2C_6H_{12}O_6$$
Amygdalin      Benz-aldehyde      Glucose One gallon of water is added to the fermented plant which is then placed in a covered vessel into which steam is introduced, the contents being continuously agitated. This treatment is maintained for about 15 minutes after which the liquor is allowed to cool and strained to remove insoluble matter. After the straining operation, one half of one per cent of formaldehyde or some other preservative is added to check fermentation and the quantity made up to exactly one gallon by the addition of water in which form it is ready for the market. The composition is used in the ratio of one pint of the extract to 1000 gallons of boiler or "make up" water.

When formed as indicated above the preparation will remove scale and rust from boiler walls, and will inhibit caustic embrittlement of the boiler plate as well as keep a clean boiler free from scale. It will be appreciated that my composition acts as a weak acid, as a reducing agent and as a colloidal dispersing agent. The last result is particularly noticeable when the preparation is used in rinsing as it aids in the removal of the last vestages of soap through its ability to increase the colloidal dispersion of soap particles. In washing the cleansing properties are accentuated and the necessity for an alkaline softener is eliminated.

From the above it will be seen that I have formed a novel composition well adapted for the purposes specified, and it is my intention to cover any variations in the specific details above set out and to be limited in this respect only as may be necessary by the scope of the claims hereto appended.

I claim:

1. A composition for removing boiler scale and the like comprising the fermented juice of plants of the order Opuntiales, and including weak organic acids, saccharides and colloidal carbohydrates.

2. A composition for removing boiler scale and for rinsing and washing, comprising the fermented fresh juice of the specie cactus, the juice including weak organic acids and mono-, di- and polysaccharides.

3. The method of forming a composition for removing boiler scale and the like, comprising crushing fresh cactus, fermenting the juice for a predetermined period of time, adding water thereto, treating the watered juice with steam, cooling the juice, then removing insoluble matter and subsequently arresting fermentation.

4. A composition for removing boiler scale and the like comprising the fermented juice of the specie cactus including a solution of weak organic acids and carbohydrates, the latter including reducing sugars.

DAVID WILLIAM HAERING.